(12) United States Patent
Harrington

(10) Patent No.: US 6,435,769 B2
(45) Date of Patent: *Aug. 20, 2002

(54) GAS-PHASE MODIFICATION IN EARTH MATERIALS

(76) Inventor: Joseph G. Harrington, P.O. 7307, Boise, ID (US) 83707

( * ) Notice: Subject to any disclaimer, the term of this patent is extended or adjusted under 35 U.S.C. 154(b) by 0 days.

This patent is subject to a terminal disclaimer.

(21) Appl. No.: 09/800,636

(22) Filed: Mar. 6, 2001

Related U.S. Application Data

(63) Continuation of application No. 09/187,471, filed on Nov. 6, 1998, now Pat. No. 6,196,765.

(51) Int. Cl.$^7$ ................................................ B09B 1/00
(52) U.S. Cl. ............................. 405/129.25; 405/128.1; 588/249
(58) Field of Search .......................... 435/262, 262.5; 405/129.1, 129.2, 129.25, 129.45, 129.6, 129.65, 128.1; 588/242, 249; 422/9, 10, 40

(56) References Cited

U.S. PATENT DOCUMENTS

| | | | |
|---|---|---|---|
| 807,290 A | 1/1905 | Krzyzanowski | 299/12 |
| 924,599 A | 1/1909 | Byers | 169/46 |
| 2,204,781 A | 1/1940 | Wattles | 44/541 |
| 2,251,321 A | 1/1941 | Brown | 44/530 |
| 3,619,147 A * | 11/1971 | Amano et al. | 423/578.2 |
| 3,650,039 A | 3/1972 | Harding | 34/530 |
| 4,076,862 A | 2/1978 | Kobeski et al. | 427/136 |
| 4,201,657 A | 5/1980 | Anderson et al. | 208/23 |
| 4,214,875 A | 7/1980 | Kromrey | 44/620 |
| 4,354,937 A | 10/1982 | Hallberg | 210/607 |
| 4,383,971 A | 5/1983 | Sherman | 44/530 |
| 4,519,912 A | 5/1985 | Kauffman et al. | 210/611 |
| 4,522,723 A | 6/1985 | Kauffman et al. | 210/611 |
| 4,584,271 A | 4/1986 | Stern et al. | 435/167 |
| 4,765,781 A | 8/1988 | Wilks et al. | 406/197 |
| 4,786,211 A * | 11/1988 | Leutner et al. | 405/264 |
| 4,789,478 A | 12/1988 | Revis et al. | 210/611 |
| 4,861,482 A | 8/1989 | Frankenberger, Jr. et al. | 210/611 |
| 4,906,575 A | 3/1990 | Silver et al. | 435/253.6 |
| 4,947,932 A | 8/1990 | Silver et al. | 166/246 |
| 5,062,956 A | 11/1991 | Lupton et al. | 210/611 |
| 5,083,611 A | 1/1992 | Clark et al. | 166/246 |
| 5,116,744 A * | 5/1992 | Ingvorsen et al. | 435/128 |
| 5,155,042 A | 10/1992 | Lupton et al. | 435/262.5 |

(List continued on next page.)

OTHER PUBLICATIONS

Thayer, Ann M., "Bioremediation: Innovative Technology for Cleaning Up Hazardous Waste", *Chemical & Engineering News*, Aug. 26, 1991, pp. 22–44.

Reinhart, D. et al., "Landfill Bioreactor Design and Operation", 1998; pp. 16–19, 148–149, 168–169, 176–177.

*Primary Examiner*—Heather Shackelford
*Assistant Examiner*—John Kreck
(74) *Attorney, Agent, or Firm*—Pedersen and Company, PLLC; Ken J. Pedersen; Barbara S. Pedersen

(57) ABSTRACT

A process for treating earth materials such as rock heaps to prevent acid rock drainage therefrom is disclosed. First, the oxygen concentration in the gas-phase of the rock heap is decreased, that is, displaced and/or depleted. This first step may be accomplished physically, chemically or biologically. Then, the gas-phase oxygen concentration in the heap is maintained at a low level. This second step may be provided for in a self-sustaining manner, like, for example, by covering the rock heap with soil and vegetation so that acid rock drainage is prevented indefinitely. Alternatively, the density of the gas-phase of the rock heap may be increased, and maintained at an elevated level indefinitely. The process is applicable to waste heaps from mining and industrial operations such as power generation and minerals processing, and to rubble collections in open and closed mines.

28 Claims, 6 Drawing Sheets

U.S. PATENT DOCUMENTS

| | | | |
|---|---|---|---|
| 5,263,795 A | 11/1993 | Corey et al. | 405/128 |
| 5,387,271 A | 2/1995 | Crawford et al. | 71/9 |
| 5,399,048 A | 3/1995 | Walker | 405/129 |
| 5,554,290 A | 9/1996 | Suthersan | 210/610 |
| 5,616,251 A | 4/1997 | Batarseh | 210/725 |
| 5,630,934 A | 5/1997 | Chesworth et al. | 205/742 |
| 5,632,715 A | 5/1997 | Harrington et al. | 588/256 |
| 5,656,489 A | 8/1997 | Fallon | 435/262.5 |
| 5,682,709 A | 11/1997 | Erickson | 47/58 |
| 5,710,361 A | 1/1998 | Harrington et al. | 588/256 |
| 6,120,627 A * | 9/2000 | Badger et al. | 149/108.8 |
| 6,196,765 B1 * | 3/2001 | Harrington | 405/128 |

(List continued on next page.)

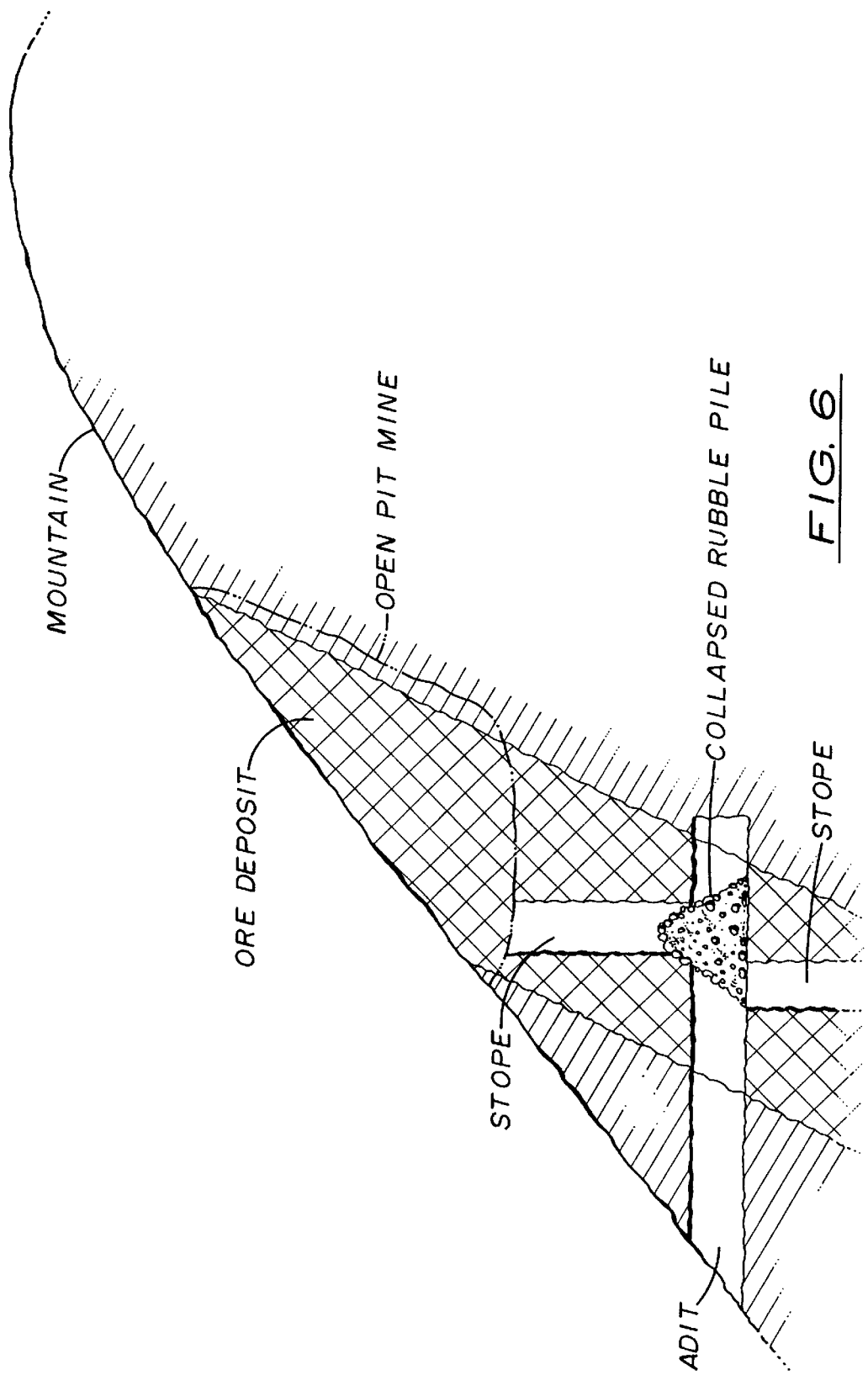

GAS-PHASE MODIFICATION IN EARTH MATERIALS

DESCRIPTION

This application is a continuation of, and claims priority of, my prior, application, Ser. No. 09/187,471, filed Nov. 6, 1998, and which is issuing on Mar. 6, 2001 as U.S. Pat. No. 6,196,765.

BACKGROUND OF THE INVENTION

1. Field of the Invention

This invention relates generally to earth materials and the environment. More specifically, this invention relates to a process for treating rock heaps to prevent oxidized species release, including acid drainage, therefrom.

2. Related Art

Acid drainage from closed mines and waste heaps has been an important environmental problem. Prior art methods to alleviate this problem include collecting and treating acidic water discharged from the polluting source. Also, other treatment methods have attempted to prevent the acid drainage from the source in the first place.

U.S. Pat. No. 4,861,482, issued Aug. 29, 1989, (Frankenberger et al.) discloses removing selenium from soil and water by adding nutrients, including cobalt, zinc and nickel ions, for microbes in the soil or water, resulting in the formation of volatile alkylselenides.

U.S. Pat. No. 5,387,271, issued Feb. 2, 1995, (Crawford et al.) discloses biodegrading nitroaromatics in soil and water with a first fermentation operation performed by an inoculum of aerobic and/or facultative microorganisms fed by an added carbohydrate nutrient. This first operation is followed by a second anaerobic operation performed by an inoculum of mixed anaerobic microorganisms fed by the remaining carbohydrate nutrient.

U.S. Pat. No. 5,399,048 (Walker), issued Mar. 21, 1995, discloses capping an exposed rock heap surface with an impermeable coating containing seeds and/or a coloring additive for esthetic purposes.

U.S. Pat. No. 5,616,251 (Batarseh), issued Apr. 1, 1997, discloses treating material causing acid mine drainage with a liquid containing a Lewis base group (M—) attached to a hydrophobic group (—R) for example, water-soluble alkylated phosphate. The Lewis base group component reacts with the metal in the acid-causing material.

U.S. Pat. No. 5,632,715 & 5,710,361 (Harrington et al.), issued Mary 27, 1997 and Jan. 1, 1998, respectively, disclose in-situ immobilization of metals in waste heaps by injecting a nutrient into a passageway into the heap, the nutrient feeding sulfide-producing microorganisms also provided to the heap to create less-soluble metal sulfides in the heap.

Still, there exists a need to prevent acid drainage from rock heaps indefinitely in a self-sustaining manner. This invention addresses that need.

SUMMARY OF THE INVENTION

The invention is a process for treating earth materials, such as rock heaps, for example, to prevent acid drainage therefrom. According to the invention, a first step comprises displacing and/or depleting the oxygen concentration in the gas-phase of the rock heap. Preferably, the rock heap gas-phase oxygen concentration is reduced in this step enough to prevent oxidative reactions that cause acid and soluble metal formation. Preferred methods of this displacement and/or depletion include: displacement by another gas, which may be called "physical depletion"; displacement/depletion by chemical reaction(s), which may be called "chemical depletion," in which oxygen is displaced by gas reaction products or is consumed by the reaction(s); or displacement/depletion by the reactions of microbiological activity and by the gasses produced by that activity, which may be called "biological depletion".

Optionally, selected microbial nutrients that favor reductive reactions rather than oxidative reactions may be added to the rock heap. This way, in rock heaps containing sulfide materials, carbon oxidation is thermodynamically favored over sulfide oxidation, causing gas-phase depletion of oxygen via carbon dioxide formation. In addition, in-situ cyanide and nitrate degradation reactions are accelerated.

Another aspect of the prevent invention is the lessening or eliminating of the "chimney effect" that typically occurs in a prior art rock pile, and the consequent lessening/eliminating of oxygen infiltration ("in-flow") into the rock pile. The "chimney effect" in a prior art rock pile is the flow of ambient air into the pile at its sides near its bottom, and then through the pile and out its top. This bottom-to-top air flow is caused by oxidative chemical/biochemical reactions occurring in the prior art rock pile, which reactions are exothermic, causing the pile to heat up. This heating effect reduces the density of the gases in the rock pile, resulting in their floating up and out of the pile. Also, because the chemical/biochemical reactions occurring in the prior art pile are oxidative, the relative composition of the gas phase changes, resulting in gases of less average density. This lighter gas composition effect also contributes to the prior art "chimney effect."

In the present invention, formation of lower oxygen concentration conditions in the rock heap increases the density of the rock heap gas-phase, blocking the "chimney effect."The formation of carbon dioxide gas ($CO_2$) from oxygen gas ($O_2$) increases the average density of the rock pile gas-phase. This increase in average density reduces or prevents updraft of rock pile gases and, therefore, infiltration by oxygen flowing into the rock pile from the lower sides of the pile. Thus, preferred embodiments of the present invention reduce the oxygen concentration in the pile by displacement and/or depletion and also by preventing infiltration of oxygen.

According to an additional step of the instant invention, the gas-phase oxygen concentration in the heap is maintained at a low level. For example, additional selected nutrients are provided to the rock heap to protect against future oxygen infiltration. Preferably, to obtain this maintenance condition indefinitely, the surface of the rock heap is covered with a thin layer of soil which is planted with vegetation. The natural biological cycle of the vegetation on the surface of the rock heap provides the microbial nutrients necessary to indefinitely maintain the low oxygen concentration conditions in the heap.

BRIEF DESCRIPTION OF THE DRAWINGS

FIG. 6 is a schematic side view of a rubble heap in a mine being treated according to an embodiment of the invention wherein the oxygen in the gas-phase of the rubble is being depleted by being biologically displaced by the product gases from microbiological activity.

DESCRIPTION OF THE PREFERRED EMBODIMENTS

Figure 1:
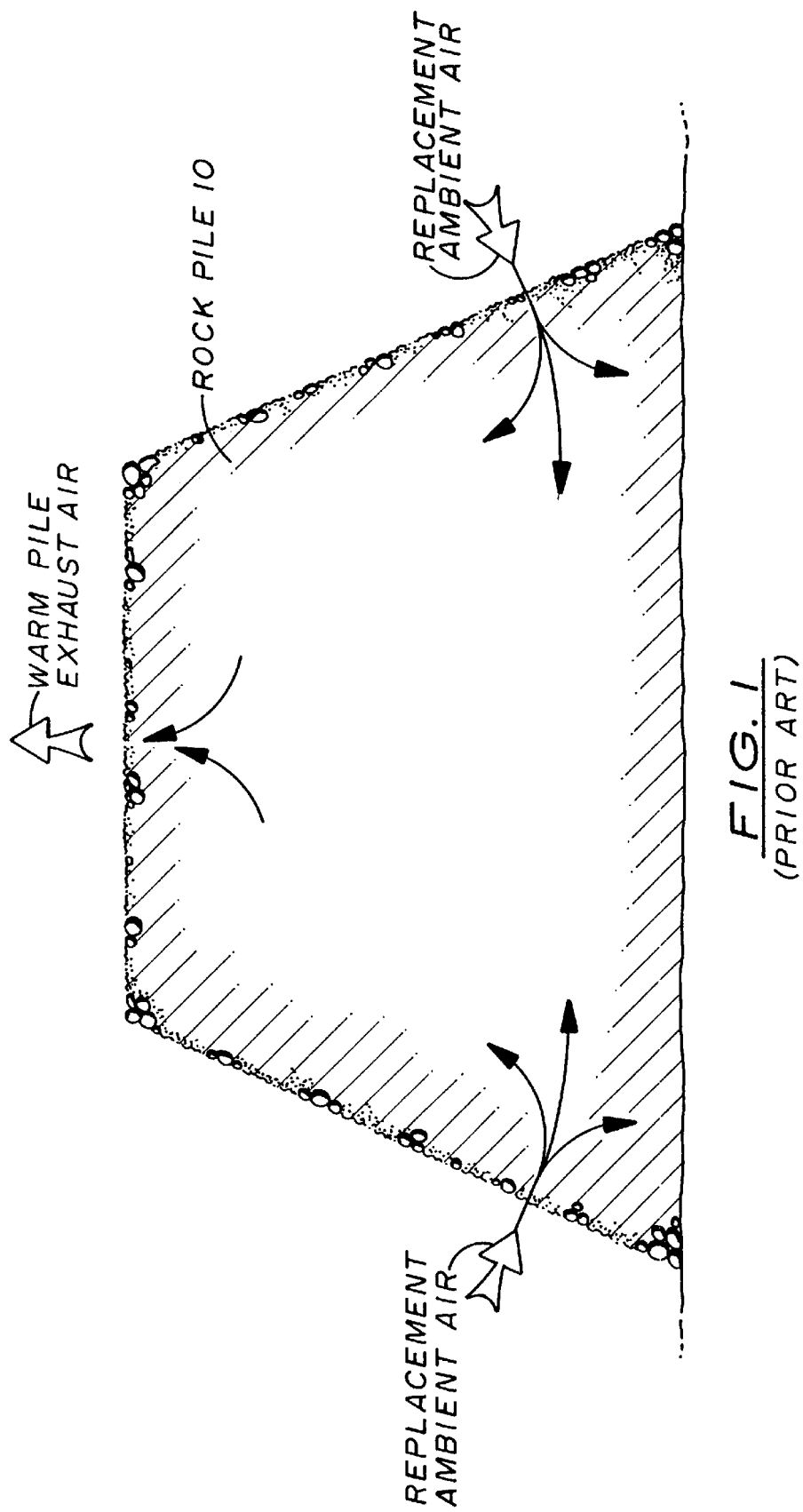
FIG. 1 is a schematic side view of a prior art waste rock heap showing the "chimney effect" resulting in oxygen infiltration into the rock heap.

Referring to the drawings, there is depicted in FIG. 1 a waste rock heap or pile 10 according to the prior art. Pile 10 is made of particulate earthen material containing, for example, sulfidic waste ore, or gangue, from a gold-mining operation. Pile 10 has solid particulate earthen material and, interspersed throughout, void spaces occupied by gases, that is, the "gas-phase" of the pile. In prior art pile 10, exothermic oxidative chemical and/or biochemical reactions occur, raising the temperature of the pile. As pile 10 heats up, the density of the gases in the pile decreases, causing the gases to rise generally in and throughout the pile, ultimately exiting the pile near its top. This "floating" up and out of the gases in and from the pile creates a relative void in the gas-phase of the pile, and ambient air, especially near the bottom sides of the pile, infiltrates pile 10 to eliminate the void. This overall flow of warmer exhaust gases out from the top of the pile, and cooler ambient air into the bottom sides of the pile, is the "chimney effect" present in prior art rock piles. An effect of the "chimney effect" is to replenish the gas-phase composition in prior art pile 10 with ambient air containing approximately 21 percent oxygen. Therefore, oxidative reactions in the prior art pile are maintained.

In prior art rock piles containing sulfidic waste ore, for example, a principal chemical biological reaction taking place includes:

$$S + O_2 \rightarrow SO_4^{2-},$$

wherein the product sulfate ($SO_4^{2-}$) component is typically water-soluble, and may leave with the pile drainage as sulfuric acid ($H_2SO_4$). This and other equations herein are not necessarily shown in stoichiometrically-balanced form, for the sake of simplicity, but will be understood by one skilled in the art.

Figure 2:
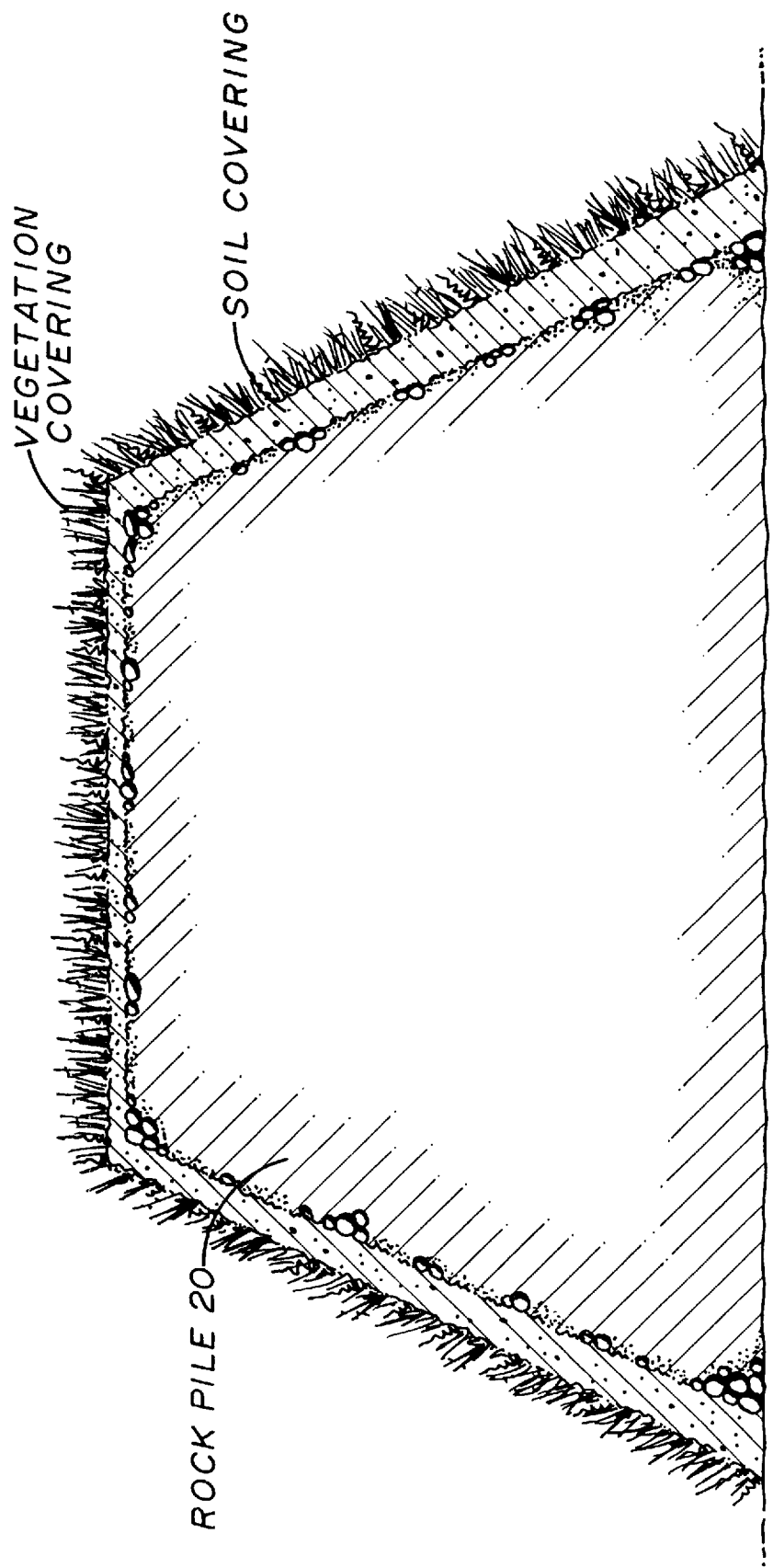
FIG. 2 is a schematic side view of a waste rock heap after treatment with an embodiment of the invention resulting in a blocking of the "chimney effect," and with the surface of the rock heap covered with soil and vegetation to indefinitely maintain a low concentration of oxygen in the gas-phase of the heap.

Referring to FIG. 2, there is depicted a waste rock heap or pile 20 after treatment with an embodiment of the invention wherein, first, the oxygen concentration of the gas-phase of pile 20 has been displaced and/or depleted, and, second, the oxygen concentration of the pile maintained at a low level by covering the pile 20 with soil and vegetation. In rock pile 20 containing sulfidic waste ore, for example, according to the present invention, a principal chemical/biological reaction taking place includes:

$$C + O_2 \rightarrow CO_2,$$

wherein the product carbon dioxide ($CO_2$) component is a gas of molecular weight 44, which is denser than air of average molecular weight about 28.8, and tends to remain in the pile.

In addition, the invention as schematically illustrated in FIG. 2 may include acceleration of in situ cyanide and nitrate degradation reactions. Such reactions may be represented as:

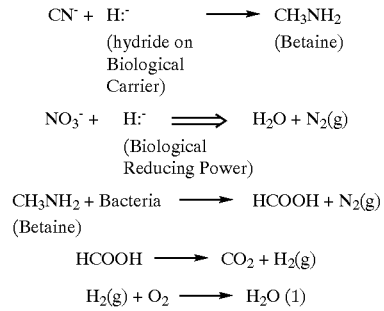

Figure 3:
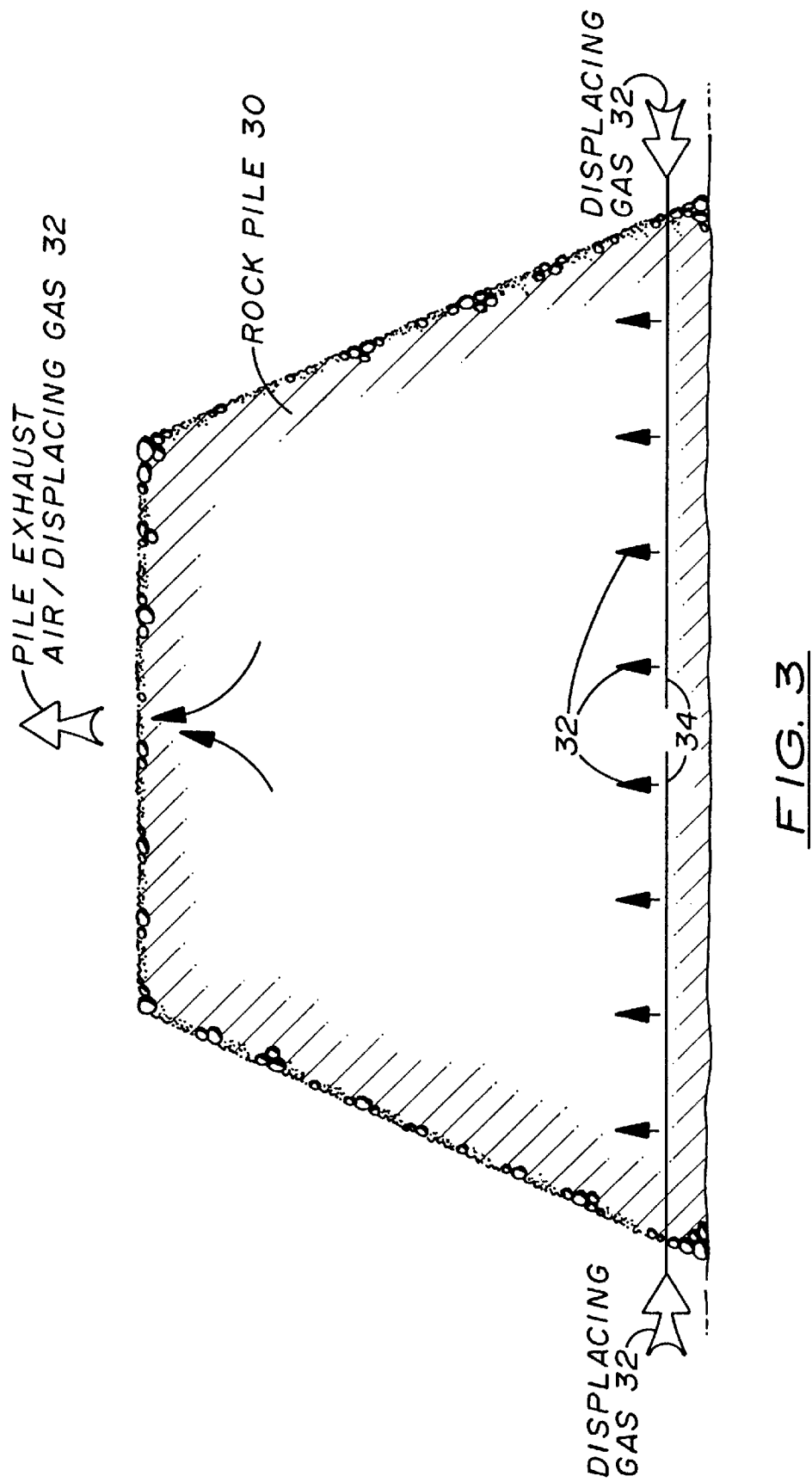
FIG. 3 is a schematic side view of a waste rock heap being treated according to one embodiment of the invention wherein the oxygen in the gas-phase of the rock is depleted by being physically displaced by another gas.

Referring to FIG. 3, there is depicted a waste rock heap or pile 30 being treated according to one embodiment of the invention wherein the oxygen in the gas-phase of the rock heap is being depleted by being physically displaced by another gas or other gases. In this case, the displacing gas(es) 32 is/are provided via an injection and distribution system 34 comprising the necessary compressors/fans and piping and, possibly, other optional equipment. For example, a gas in bountiful local supply such as methane ($CH_4$), ethane ($C_2H_6$) or propane ($C_3H_8$) or mixtures thereof may be delivered to the injection and distribution system 34 for supply under pressure to rock pile 30. Eventually, displacing gas 32 will deplete the oxygen concentration in the gas-phase of the rock heap 30 to a level low enough to prevent oxidative reactions that cause acid and soluble metal formation. Therefore, by "physically depleted," I mean that the oxygen concentration in the gas-phase of the rock pile is decreased by the oxygen gas being replaced by a substitute gas, or removed and replaced by a vacuum, or absorbed by an absorbent.

Other displacing gases 32 and mixtures thereof may be used, regardless whether their average densities are greater or less than the density of air (about 0.00119 g/ml at ambient conditions). Preferably, a mixture of displacing gases, with one or more of the gases in the mixture being lighter (less dense) than air, and one or more of the gases in the mixture being heavier (more dense) than air, is used. This way, the lighter gas(es) will sweep out the oxygen from the top of the rock heap 30 as it (they) rise(s) through the heap, and the heavier gas(es) will stay in and settle down to the bottom of the heap, preventing infiltration by oxygen. Of course, the activity and effects of displacing gas(es) 32 need to be carefully considered and accounted for in advance. For example, in the case described above, the risk of fire and explosion created by the use of combustible mixtures of gases must be minimized or eliminated or, if allowed, carefully controlled.

Figure 4:
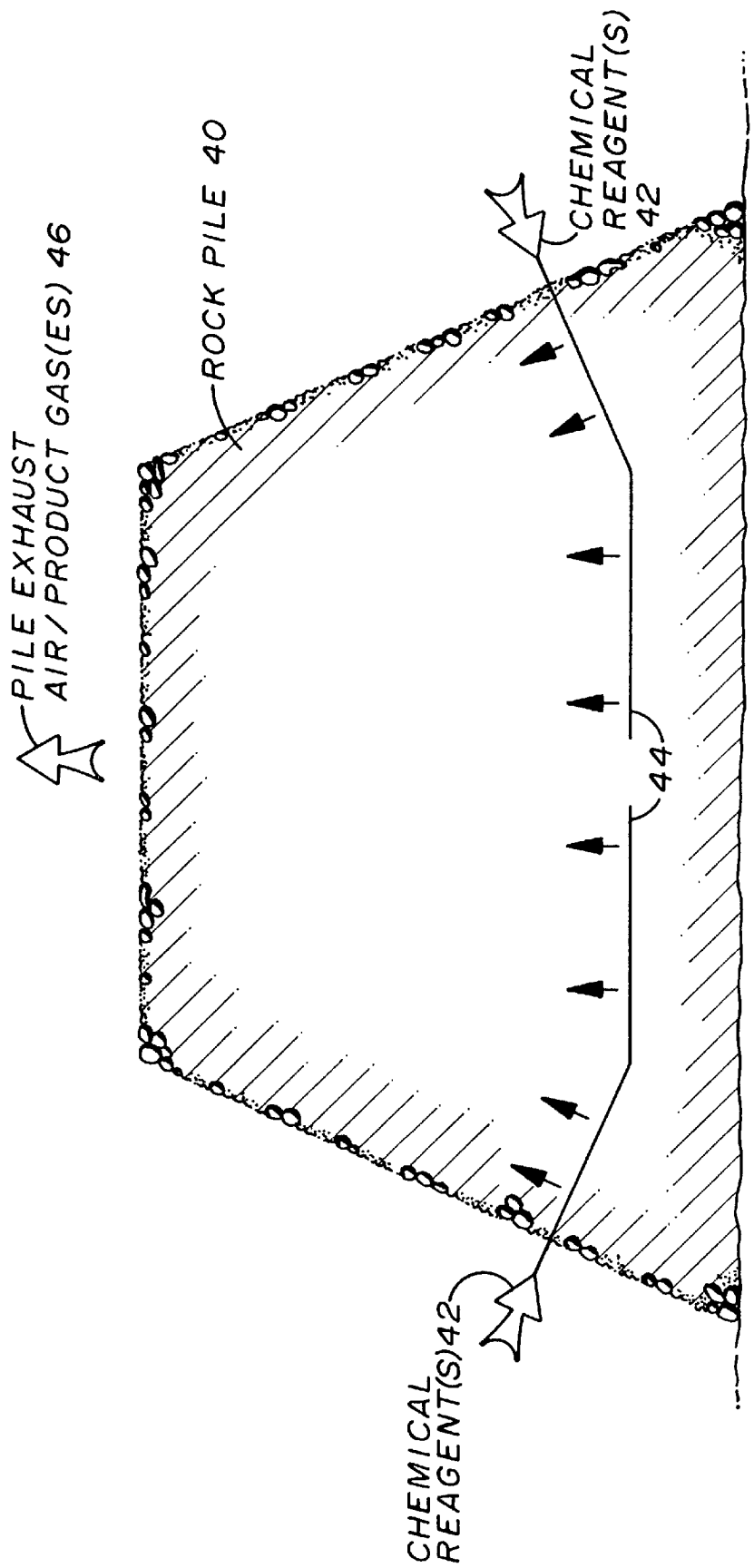
FIG. 4 is a schematic side view of a waste rock heap being treated according to another embodiment of the invention wherein the oxygen in the gas-phase of the rock heap is depleted by being chemically displaced by the product gases from a chemical reaction.

Referring to FIG. 4, there is depicted a waste rock heap or pile 40 being treated according to one embodiment of the invention wherein the oxygen in the gas-phase of the rock heap is being depleted by being chemically displaced by the product gases from, or consumed in, a chemical reaction. In this case, the chemical reagents is/are provided via an injection and distribution system 44 comprising the necessary compressors/fans or pumps and piping and, possibly, other optional equipment. For example, (a) chemical reagent (s) in bountiful local supply, such as sodium bicarbonate ($NaHCO_3$) and water ($H_2O$), may be delivered to the injection and distribution system 44 for supply under pressure to rock pile 40. The reactants react within the rock pile, resulting in (a) product gas(es) 46, in this case, carbon dioxide ($CO_2$), which eventually will displace and deplete the oxygen concentration in the gas-phase of the rock heap 40 to a level low enough to prevent oxidative reactions that cause acid and soluble metal formation. Therefore, by "chemically depleted," I mean that the oxygen concentration in the gas phase of the rock pile is decreased by the oxygen gas being replaced by a reactant gas or gasses, or by being removed by being consumed as a reagent, in a chemical reaction.

Other reagents 42 and mixtures thereof may be used, regardless whether their average densities are greater than or less than the density of air. Preferably, a mixture of product gases, with one or more of the gases in the mixture being lighter than air, and one or more of the gases being heavier than air, is used for the reasons discussed above relating to FIG. 3. Also, chemical reactions may be used which involve and consume the gases already in the gas-phase of the rock pile 40. For example, a fuel-gas may be injected into distribution system 44, and a controlled bum of the gas effected within rock pile 40. This burn would deplete the oxygen within pile 40 by combining most of it with carbon to form carbon monoxide (CO) and/or carbon dioxide ($CO_2$). Furthermore, this bum may leave a sooty film on the rock particles within rock pile 40, and contribute to maintenance of low oxygen conditions in the pile after the burn according to microbiological activity in a manner similar to that discussed below relating to FIG. 5.

Figure 5:
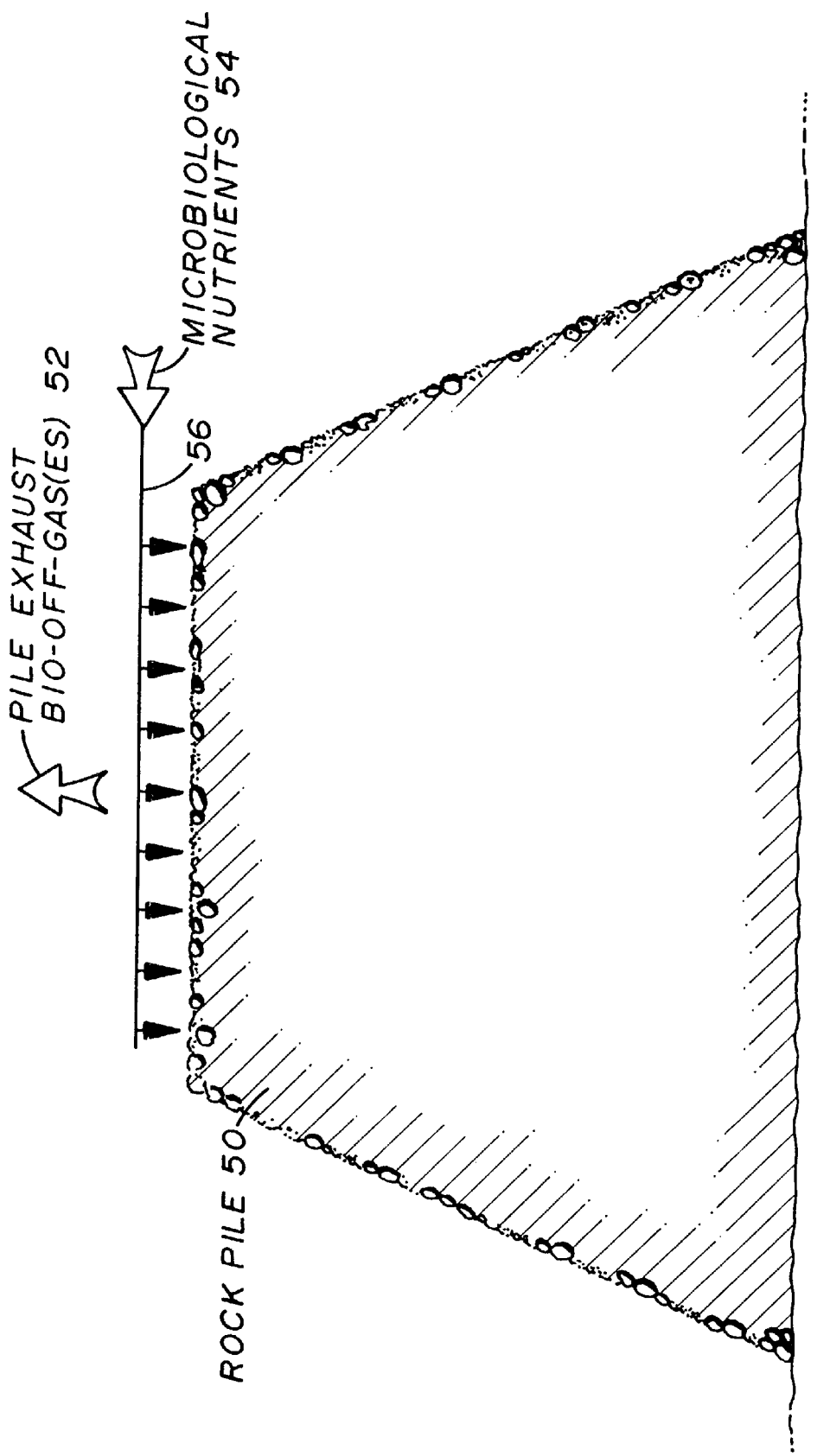
FIG. 5 is a schematic side view of a waste rock heap being treated according to another embodiment of the invention wherein the oxygen in the gas-phase of the rock heap is depleted by being biologically displaced by the product gases from microbiological activity.

Referring to FIG. 5, there is depicted a waste rock heap or pile 50 being treated according to one embodiment of the invention wherein the oxygen in the gas-phase of the rock heap is being depleted by being biologically displaced by the product gases from microbiological activity. In this case, the bio off-gases result from biological activity within pile 50, which activity may be encouraged or maintained by microbiological nutrients 54 provided by an injection or distribution system 56. System 56 comprises the necessary pumps and piping and, possibly other optional equipment for handling, for example, liquid solutions and/or suspensions or sugars, proteins and other nutrients, enzymes, vitamins and minerals that are specially selected, mixed and provided, with the specific nutritional requirements of the bacterial and phage populations in the rock pile 50 in mind. For example, one approach to depleting oxygen by displacement by gases from microbiological activity may be described by the following:

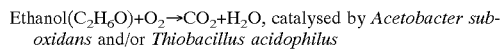
Ethanol($C_2H_6O$)+$O_2$→$CO_2$+$H_2O$, catalysed by *Acetobacter suboxidans* and/or *Thiobacillus acidophilus*

In this case, the oxygen in the rock pile is consumed by the chemical reaction that is catalyzed by microbiological activity, and is displaced by the $CO_2$ formed. Other bacteria types and mixtures thereof may be used, regardless whether they are indigenous to the region of the rock pile or not.

If indigenous bacteria populations are not sufficient to obtain or maintain low oxygen conditions, the indigenous bacteria populations may be supplemented by adding additional indigenous bacteria or additional non-indigenous bacteria. Other nutrients and mixtures thereof may also be used. Again, these bacteria populations and nutrients may be selected to displace or consume the oxygen originally present in the rock pile gas-phase. Also, these populations and nutrients may be adjusted to account for the change in the content of the gas-phase of the rock pile as the oxygen concentration is first decreased and then maintained. For example, the following describes one approach to maintaining a decreased oxygen concentration:

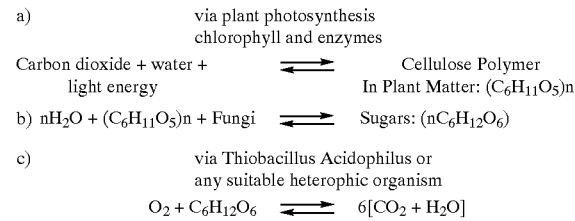

a) Carbon dioxide + water + light energy ⇌ Cellulose Polymer In Plant Matter: $(C_6H_{11}O_5)n$ (via plant photosynthesis chlorophyll and enzymes)

b) $nH_2O + (C_6H_{11}O_5)n$ + Fungi ⇌ Sugars: $(nC_6H_{12}O_6)$ c) $O_2 + C_6H_{12}O_6$ ⇌ $6[CO_2 + H_2O]$ (via Thiobacillus Acidophilus or any suitable heterophic organism)

Other maintenance techniques may also be used to keep the depleted oxygen concentration at a lower level suitable for the purposes of the present invention. For example, the rock pile may be capped with an impervious cover, like, for example, thick soil or other earth material, concrete or a polymer blanket. Then, optionally, additional microbiological nutrients may be supplied to the interior of the rock pile through holes or conduits in the impermeable cover. Likewise, even when the thin soil and vegetative covers are used, depending on geographical, climatological and other factors, additional microbiological nutrients may be required or desired, and, therefore, may be injected or otherwise added to the pile beneath the covers. Microbiological nutrients may be added after the rock heap is created, as discussed above. Also, these nutrients may be added as the rock heap is created, for example, by adding a carbon source from, for example, waste timber, brush or food processing waste, to each truckload or conveyor discharge load to the heap. Also, these microbiological nutrients may be added before the heap is created, by, for example, adding a carbon source to the explosive charge when the original ore pile is created (see the discussion relating to FIG. 6 below).

Generally, the engineering design parameters for rock piles are functions of the surface/volume ratio of the pile. See *Solution Mining—Leaching and Fluid Recovery of Materials*, second edition, by Robert W. Bartlett, Gordon and Breach Science Publishers, 1998, particularly Chapters 7, 8 and 15.

As stated earlier, microbiological activity that favors reductive reactions in the heap is especially beneficial. Examples of microbiological nutrients that favor these reductive reactions are sugars (dextrose, fructose, sucrose, lactose, etc.), alcohol (methanol, ethanol, ethylene glycol, glycerol), fatty acids, preferably, a mixture of dextrose and methanol/ethanol with a slow release component such as fatty acids. Typically, these nutrients are applied in the following amounts: 0.1 lb sugars, 0.2 lb alcohols and 0.05 lb fats per ton rock, depending on the moisture content of the rock and the extent of prior oxidation products contained in the rock, and the site-specific meteoric flux.

Referring to FIG. 6, there is depicted a schematic side view of a rubble heap in a mine being treated according to an embodiment of the invention, wherein the oxygen in the gas-phase of the rubble is being depleted by being biologically displaced by product gases from microbiological activity in the rubble. According to this embodiment of the invention, the oxygen in the gas phase of the rubble may be depleted in a manner similar to that discussed above relating to FIG. 5. One way to introduce the selected nutrients to the rubble of this embodiment is to have nutrients incorporated in sufficient quantities with the explosive devices used to create the mine rubble. For example, several hundred pounds of sugars and/or starches, plus optional enzymes, vitamins and minerals, may be placed onto the rock face containing the ammonium nitrate—fuel oil mixture, which is commonly known as "ANFO" and which is detonated to form the rubble pile. By the carbon addition resulting from the sugar or starch nutrient, the rubble is prevented from oxidation and if sufficient excess nutrient is added, the nitrate residual from the explosive material may be bioreduced as a source of oxygen for the carbon oxidation.

By a "lower oxygen concentration," suitable for the purposes of the present invention, I mean a concentration in the range of from about 0% to 18 vol %, and preferably from about 0% to 3%. At or below these ranges of oxygen concentration, oxidative reactions that cause acid and soluble metal formation are inhibited or minimized or prevented.

Practically, in the field, the oxygen concentration in the rock pile may be determined by conventional techniques, for example, by oxygen sensors in the gas or liquid phase of the heap. Alternatively, a "break-through" approach to estimating displacement of oxygen by detecting the presence or concentration of the displacing gas may be used. For example, the presence of hydrocarbon gases may be detected, and their displacement of oxygen continued to excess, to ensure an oxygen concentration below about 3%.

Alternatively, a "lower oxygen concentration" suitable for the purposes of the present invention may be inferred or deduced from a measured rock pile gas-phase density greater than about 0.00125 g/ml, or the mean ambient gas phase density. In this case, a rock pile gas-phase density greater than this amount will result in a blocking of the rock pile "chimney effect." Rock pile gas phase density may be measured by conventional techniques, for example, a thermocouple gauge may be used as described in Levine, 1995 (*Physical Chemistry*, Ira N. Levine, 1995, page 11).

Compared to the process disclosed in the Harrington patents '715 and '361 discussed above, the instant invention is applicable to waste heaps which are not oxidized to the extent that a significant fraction of metals are already mobile by dissolution in drainage water. For example, this invention is applicable to waste heaps containing substantially more sulfidic wastes than oxidized wastes. With sulfidic waste ore, or gaugue, from a gold mining operation, for example, when the waste heap is first created, it contains mostly sulfidic materials, and few oxidized materials. Then, as the "chimney effect" is created and continues for the heap, gradually, as time passes, more and more of the sulfidic materials in the heap are oxidized to become sulfates, which sulfates are water soluble and may be leached from the heap and appear as acid drainage. If this condition is allowed to continue for a long time, eventually the heap contains mostly oxidized materials, and the possibly toxic oxidized metals are considered to be "mobile", that is, subject to dissolution in the heap drainage and appearing as contaminants in it. For this advanced stage of waste heap deterioration, the process of the Harrington patents '715 and '361 is particularly applicable. That is, the treatment liquid of these patents, containing the microbe nutrients for producing microbial sulfides and ultimately metal sulfides, inhibits the migration of already "mobile" oxidized metals.

The instant invention, on the other hand, is applicable to waste heaps in which the possibly toxic metals are not yet "mobile" due to oxidation. In effect, the instant invention prevents the subject metals from becoming oxidized or "mobile" in the first place. This is a very positive advantage because, if the instant invention is applied to a waste heap early enough, the risk of any possibly toxic metal mobilization is minimized. Plus, with the process of the instant invention, after the depleted oxygen condition is obtained, it can be easily, inexpensively and indefinitely maintained, for example, by simply covering the surface of the waste heap with a thin layer of soil and establishing and maintaining a vegetative population thereupon.

Many of the embodiments of the invented methods feature both oxygen depletion/displacement and gas-phase density increase, and the categories of invented steps may be described by similar language. For example, while the oxygen concentration may be "physically depleted," "chemically depleted," or "biologically depleted," for example, the gas-phase density may be said to be increased by similar types of steps, that is, by being "physically increased," "chemically increased," or "biologically increased".

EXAMPLE of One Embodiment of Complete Invention

Treatment of an exemplary rock heap is performed. Initial values of the rock heap are:

1 million ton heap of rock waste material permeability of $10^2$ darcys

2% sulfur (total)

1.8% sulfide sulfur (90% sulfide, 10% oxidized)

Treatment Phase a) 70,000 lbs. of a sugar syrup is injected into the heap, followed by 140,000 lbs. of an alcohol such as methanol.

b) After allowing for sufficient reaction time and the addition of water suitable to force the reagents into the heap (at least enough water is used to solubilize the alcohol) the surface of the heap is covered with a fine layer of soil and planted with native seed mixes. This soil will cause a reduction in the permeability of the heap to below 10 darcy, such that the gases contained and being produced are not able to leak out except by plant uptake through roots, and by diffusion through the heap surface.

Maintenance Phase

If the soil and climate characteristics are not sufficient and oxygen content rises within the heap, then an injection of 2,000–10,000 lbs. of a sugar/alcohol mixture may be added annually, or less frequently, to maintain reducing conditions. This additional dosage should be applied, taking into consideration the climate, the geographic orientation, and other factors affecting vegetative success.

Although this invention has been described above with reference to particular means, materials and embodiments, it is to be understood that the invention is not limited to these disclosed particulars, but extends instead to all equivalents within the scope of the following claims.

I claim:

1. A process for treating a rock heap to inhibit acid drainage therefrom, said rock heap containing more reduced sulfur material than oxidized sulfur material and comprising a rock heap gas phase, said process comprising:

decreasing the oxygen concentration and increasing gas phase density in the rock heap gas phase by displacing oxygen with a gas-phase component selected from the group consisting of:

carbon dioxide injected into the rock heap, gas comprising carbon dioxide injected into the rock heap, carbon dioxide produced by chemical reaction of reagents added to the rock heap, and carbon dioxide produced from microbiological activity on biological nutrients added to the rock heap; and the process further comprising maintaining the condition of decreased oxygen concentration and increased gas phase density, wherein the increased density of the gas phase is maintained by covering the rock heap with a soil layer.

2. The process of claim 1 wherein the rock heap is rubble in a mine.

3. The process of claim 1 wherein the rock heap is rubble in an underground mine.

4. The process of claim 1 wherein the rock heap is waste rock from a mine.

5. The process of claim 1 wherein the rock heap is covered by a layer of soil and vegetation.

6. A process for treating a rock heap to inhibit acid drainage therefrom, said rock heap containing more reduced sulfur material than oxidized sulfur material and comprising a rock heap gas phase, said process comprising:

decreasing the oxygen concentration and increasing gas phase density in the rock heap gas phase by displacing oxygen with a gas-phase component selected from the group consisting of:
carbon dioxide injected into the rock heap, gas comprising carbon dioxide injected into the rock heap, carbon dioxide produced by chemical reaction of reagents added to the rock heap, and carbon dioxide produced from microbiological activity on biological nutrients added to the rock heap; and the process further comprising maintaining the condition of decreased oxygen concentration and increased gas phase density, wherein the step of maintaining the condition of decreased oxygen concentration and increased gas phase density is done by adding biological nutrients to the rock heap.

7. A process for treating a rock heap to inhibit acid drainage therefrom, said rock heap containing more reduced sulfur material than oxidized sulfur material and comprising a rock heap gas phase, said process comprising decreasing the oxygen concentration and increasing density of the rock heap gas phase by adding a reagent that reacts to form carbon dioxide in the rock heap to reduce said oxygen, and said process further comprising maintaining the condition of decreased oxygen concentration and increased gas phase density, wherein said reagent is selected from a group consisting of methane, ethane, propane, fuel gas, carbonates, waste timber materials, food processing waste, sugars, starches, and mixtures thereof.

8. The process of claim 7 wherein said reagent reacts chemically to form carbon dioxide.

9. The process of claim 7 wherein the reagent is a carbon-containing reagent, and the process further comprises adding said carbon-containing reagent in excess of an amount needed to decrease oxygen.

10. A process for treating a rock heap to inhibit acid drainage therefrom, said rock heap containing more reduced sulfur material than oxidized sulfur material and comprising a rock heap gas phase, said process comprising decreasing the oxygen concentration and increasing density of the rock heap gas phase by adding a reagent that reacts to form carbon dioxide in the rock heap to reduce said oxygen, and said process further comprising maintaining the condition of decreased oxygen concentration and increased gas phase density, wherein said reagent reacts biologically to form carbon dioxide.

11. A process for treating a rock heap to inhibit acid drainage therefrom, said rock heap containing more reduced sulfur material than oxidized sulfur material and comprising a rock heap gas phase, said process comprising decreasing the oxygen concentration and increasing density of the rock heap gas phase by adding a reagent that reacts to form carbon dioxide in the rock heap to reduce said oxygen, and said process further comprising maintaining the condition of decreased oxygen concentration and increased gas phase density, wherein said reagent is added to the rock heap as the rock heap is created.

12. The process of claim 11 wherein adding said reagent as the rock heap is created is done by adding said reagent to truckloads of rock.

13. The process of claim 11 wherein adding said reagent as the rock heap is created is done by adding said reagent to a conveyor belt.

14. The process of claim 11 wherein adding said reagent as the rock heap is created is done by providing said reagent to an explosive system used to create the rock heap.

15. A process for treating a rock heap to inhibit acid drainage therefrom, said rock heap containing more reduced sulfur material than oxidized sulfur material and comprising a rock heap gas phase, said process comprising decreasing the oxygen concentration and increasing density of the rock heap gas phase by adding a reagent that reacts to form carbon dioxide in the rock heap to reduce said oxygen, and said process further comprising maintaining the condition of decreased oxygen concentration and increased gas phase density, wherein the reagent is a carbon-containing reagent, and the process further comprises adding said carbon-containing reagent in excess of an amount needed to decrease oxygen and wherein oxygen is decreased below about 3 volume % in said gas phase.

16. The process of claim 15 further comprising degradation of nitrates in said rock heap by bio-reducing said nitrates, wherein said nitrates are an oxygen source for carbon oxidation of the excess carbon-containing reagent.

17. The process of claim 15 further comprising degradation of cyanides in said rock heap, by bio-reducing said cyanides.

18. A process for treating rubble in an underground mine to inhibit acid drainage therefrom, said rubble containing more reduced sulfur material than oxidized sulfur material and comprising a rubble gas phase, said process comprising decreasing the oxygen concentration and increasing density of the rubble gas phase by adding a reagent that reacts to form carbon dioxide in the rubble to reduce said oxygen, and said process further comprising maintaining the condition of decreased oxygen concentration and increased gas phase density, wherein said reagent is selected from a group consisting of methane, ethane, propane, fuel gas, carbonates, waste timber materials, food processing waste, sugars, starches, and mixtures thereof.

19. The process of claim 18 wherein said reagent reacts chemically to form carbon dioxide.

20. The process of claim 18 wherein the reagent is a carbon-containing reagent, and the process further comprises adding said carbon-containing reagent in excess of an amount needed to decrease oxygen.

21. A process for treating rubble in an underground mine to inhibit acid drainage therefrom, said rubble containing more reduced sulfur material than oxidized sulfur material and comprising a rubble gas phase, said process comprising decreasing the oxygen concentration and increasing density of the rubble gas phase by adding a reagent that reacts to form carbon dioxide in the rubble to reduce said oxygen, and said process further comprising maintaining the condition of decreased oxygen concentration and increased gas phase density, wherein said reagent reacts biologically to form carbon dioxide.

22. A process for treating rubble in an underground mine to inhibit acid drainage therefrom, said rubble containing more reduced sulfur material than oxidized sulfur material and comprising a rubble gas phase, said process comprising decreasing the oxygen concentration and increasing density of the rubble gas phase by adding a reagent that reacts to form carbon dioxide in the rubble to reduce said oxygen, and said process further comprising maintaining the condition of decreased oxygen concentration and increased gas phase density, wherein said reagent is added to the rubble as the rubble is created.

23. The process of claim 22 wherein adding said reagent as the rubble is created is done by adding said reagent to truckloads of rock.

24. The process of claim 22 in adding said reagent as the rubble is created is done by adding said reagent to a conveyor belt.

25. The process of claim 22 wherein adding said reagent as the rubble is created is done by providing said reagent to an explosive system used to create the rubble.

26. A process for treating rubble in an underground mine to inhibit acid drainage therefrom, said rubble containing more reduced sulfur material than oxidized sulfur material and comprising a rubble gas phase, said process comprising decreasing the oxygen concentration and increasing density of the rubble gas phase by adding a reagent that reacts to form carbon dioxide in the rubble to reduce said oxygen, and said process further comprising maintaining the condition of decreased oxygen concentration and increased gas phase density, wherein the reagent is a carbon-containing reagent, and the process further comprises adding said carbon-containing reagent in excess of an amount needed to decrease oxygen and wherein oxygen is decreased below about 3 volume % in said gas phase.

27. The process of claim 26 further comprising degradation of nitrates in said rubble by bio-reducing said nitrates, wherein said nitrates are an oxygen source for carbon oxidation of the excess carbon-containing reagent.

28. The process of claim 26 further comprising degradation of cyanides in said rubble, by bio-reducing said cyanides.

* * * * *